(12) United States Patent
Roberts et al.

(10) Patent No.: US 7,559,572 B2
(45) Date of Patent: Jul. 14, 2009

(54) MOTOR VEHICLE SAFETY DEVICE

(75) Inventors: Tony Roberts, East Sussex (GB); Stephen Stubbs, Portsmouth (GB); Conrad Fricke, Munich (DE)

(73) Assignee: Autoliv Development AB, Vargarda (SE)

( * ) Notice: Subject to any disclaimer, the term of this patent is extended or adjusted under 35 U.S.C. 154(b) by 537 days.

(21) Appl. No.: 10/509,768

(22) PCT Filed: Feb. 24, 2003

(86) PCT No.: PCT/SE03/00296

§ 371 (c)(1),
(2), (4) Date: Aug. 5, 2005

(87) PCT Pub. No.: WO03/086822

PCT Pub. Date: Oct. 23, 2003

(65) Prior Publication Data

US 2006/0012154 A1 Jan. 19, 2006

(30) Foreign Application Priority Data

Apr. 5, 2002 (GB) ................... 0207924.2

(51) Int. Cl.
*B60R 21/213* (2006.01)
*B60R 21/18* (2006.01)
(52) U.S. Cl. .................. 280/730.2; 280/743.2
(58) Field of Classification Search .............. 280/730.2, 280/743.2
See application file for complete search history.

(56) References Cited

U.S. PATENT DOCUMENTS

| 3,687,485 | A |   | 8/1972 | Campbell |  |
|---|---|---|---|---|---|
| 5,588,672 | A |   | 12/1996 | Karlow et al. |  |
| 6,155,597 | A | * | 12/2000 | Bowers et al. | 280/730.2 |
| 6,241,277 | B1 | * | 6/2001 | Heigl et al. | 280/730.2 |
| 6,347,807 | B1 | * | 2/2002 | Schink et al. | 280/730.2 |
| 6,375,216 | B1 | * | 4/2002 | Eschbach | 280/730.1 |
| 6,464,250 | B1 |   | 10/2002 | Faigle et al. |  |
| 6,561,545 | B2 | * | 5/2003 | Greib et al. | 280/743.2 |
| 6,733,035 | B2 | * | 5/2004 | Thomas et al. | 280/730.2 |
| 6,994,371 | B2 | * | 2/2006 | Bossecker et al. | 280/730.2 |
| 7,000,944 | B2 | * | 2/2006 | Bakhsh et al. | 280/730.1 |
| 7,125,039 | B2 | * | 10/2006 | Bossecker et al. | 280/730.2 |

(Continued)

FOREIGN PATENT DOCUMENTS

DE 197 04 051 A1 8/1998

(Continued)

*Primary Examiner*—John Q. Nguyen
*Assistant Examiner*—Karen Amores
(74) *Attorney, Agent, or Firm*—Brinks Hofer Gilson & Lione Arbor

(57) ABSTRACT

A safety device for a motor vehicle comprising an inflatable curtain having an upper edge and a lower edge. The upper edge is to be mounted within the interior of a motor vehicle. A first portion of an elongate, flexible element such as a cord extends from a mounting point on the lower edge over a pulley to a sliding ring. A second portion of the cord extends from the mounting point through a guide round a lower pulley through the ring to a lower anchoring point. As the inflatable element inflates so the mounting point on the lower edge moves downwardly, and a triangle of tension is created between the upper pulley, the lower pulley and the mounting point.

13 Claims, 4 Drawing Sheets

U.S. PATENT DOCUMENTS

| | | | |
|---|---|---|---|
| 7,144,036 B2 * | 12/2006 | Kai | 280/731 |
| 2002/0056974 A1 * | 5/2002 | Webert | 280/728.2 |
| 2002/0175502 A1 * | 11/2002 | Tesch et al. | 280/730.2 |
| 2004/0100073 A1 * | 5/2004 | Bakhsh et al. | 280/730.1 |
| 2008/0106083 A1 * | 5/2008 | Walston | 280/743.2 |

FOREIGN PATENT DOCUMENTS

| | | |
|---|---|---|
| JP | 2002-114125 A | 4/2002 |
| WO | WO 00/68042 | 11/2000 |

* cited by examiner

MOTOR VEHICLE SAFETY DEVICE

CROSS REFERENCE TO RELATED APPLICATION

This application claims priority to GB 0207924.2 filed Apr. 5, 2002 and PCT/SE03/00296 filed Feb. 24, 2003.

BACKGROUND OF THE INVENTION

The present invention relates to a safety device for a motor vehicle, and more specifically to a motor vehicle safety device incorporating an inflatable curtain.

When a motor vehicle is involved in an accident there is a risk that the driver and passengers within the vehicle will be injured. It has been proposed to provide vehicles with safety devices to reduce the risk of such injury.

Certain safety devices are intended to provide protection in the case of a side impact. European Patent EP-A-0808257 discloses such a device, in which an inflatable element is provided which is initially stored in position in a recess in a door frame of the vehicle. There is provided a gas generator which is adapted to generate gas, such as cold gas, the gas generator incorporating a sensor which senses a side impact and/or roll-over situation and subsequently activates the gas generator at an appropriate instant. The gas generator is connected to the inflatable element, and when a side impact occurs, the gas generator generates cold gas which inflates the inflatable element. The inflatable element thus moves from its initial stored position within the recess in the door frame, to the operative position, where it forms a substantially flat curtain located between the head of the person and the adjacent window.

A problem associated with such side impact safety devices is that of providing a tensioning means for the inflatable element when it is in an operable position, so that it offers sufficient protection against the head of a person passing through the window. In the case of EP-A-0808257, where the recess in which the inflatable element is initially stored spans at least one of the "A" and "C" posts of the vehicle such that it is non-linear, the inflatable element is separated into a plurality of vertical cells. Upon inflation, the lower edge of the inflatable element is thus decreased in length which, as a result of the upper edge of the inflatable element being fixedly attached to the non-linear door frame, creates a tension in the lower edge of the inflatable element, holding the inflatable element in place and offering protection for the passenger in a roll-over situation.

U.S. Pat. No. 6,241,277 discloses an arrangement for tensioning a side airbag when the recess in the door frame in which the airbag is initially stored is substantially linear. Two pulleys are provided, one fixed to the door frame of the motor vehicle, above the recess in which the airbag is initially stored, and the other fixed to a point on the motor vehicle in a position in front of the leading edge of the airbag. A cord is attached, at one end, to the leading edge of the airbag and, at the other end, to a point on the airbag positioned rearwardly of the leading edge. The cord is substantially inextensible except for an elastic portion which is initially under little or no tension. During a side impact situation, the airbag is inflated downward toward the base of the window of the motor vehicle and the cord and pulley system are positioned such that, as the airbag moves downwardly, tension is created in the elastic portion of the cord, the tension having a component along the lower edge of the airbag as desired.

It is an object of the present invention to provide an improved safety device incorporating a tensioning system for tensioning an inflatable curtain.

SUMMARY OF THE INVENTION

According to one aspect of the present invention there is provided a safety device for a motor vehicle comprising an inflatable curtain having an upper edge and a lower edge, the upper edge being adapted to be mounted within the interior of a motor vehicle, a first portion of elongate, flexible element being attached to and extending from a point on said inflatable curtain, a second portion of elongate flexible element being attached to and extending from a point on the inflatable curtain, the first portion of elongate, flexible element incorporating a slide member adapted to slidably retain a length of said second portion of elongate, flexible element.

Preferably, the first and second portions of elongate, flexible element are separate portions of a single elongate, flexible element.

Conveniently, the first and second portions of elongate, flexible element are attached to the inflatable curtain at a common point.

Preferably, the first and second portions of elongate, flexible element are each attached to a point on the inflatable curtain which is in the region of the lower edge.

Conveniently, the member is adapted to slidably retain a length of the second portion of elongate, flexible element is in the form of a rigid ring.

In a preferred embodiment, one of the portions of elongate flexible element is elastic.

Preferably, both of the portions of elongate flexible element are elastic.

In another preferred embodiment, both of the portions of elongate flexible element are inextensible.

Conveniently, the point of attachment of one of the portions of elongate flexible element to the inflatable curtain is in the form of an elastic connection.

Preferably, the point of attachment of both portions of elongate flexible element to the inflatable curtain is in the form of an elastic connection.

In another preferred embodiment, the device is mounted within a motor vehicle, the upper edge of the inflatable element being mounted to the vehicle, the first elongate flexible element portion engaging with a first guide element fixed to a point within the motor vehicle, the second elongate flexible element being further attached to a fixed point within the motor vehicle, the fixed point being below the first guide element, the slide member slidably retaining the second portion of elongate flexible element wherein upon inflation of the inflatable curtain, the lower edge moves to a position below the guide element and the portions of elongate flexible element thereby create tension along a line of the inflatable curtain, between the portions and a securing point for the inflatable curtain.

Preferably, the device further comprises a second guide element positioned within the motor vehicle at a point below the first guide element, the second guide element engaging with the second portion of elongate flexible element between the slide member and inflatable curtain.

In order that the invention may be more readily understood, and so that further features thereof may be appreciated, the invention will now be described by way of example with reference to the accompanying drawings in which:

DETAILED DESCRIPTION OF THE INVENTION

Figure 1:
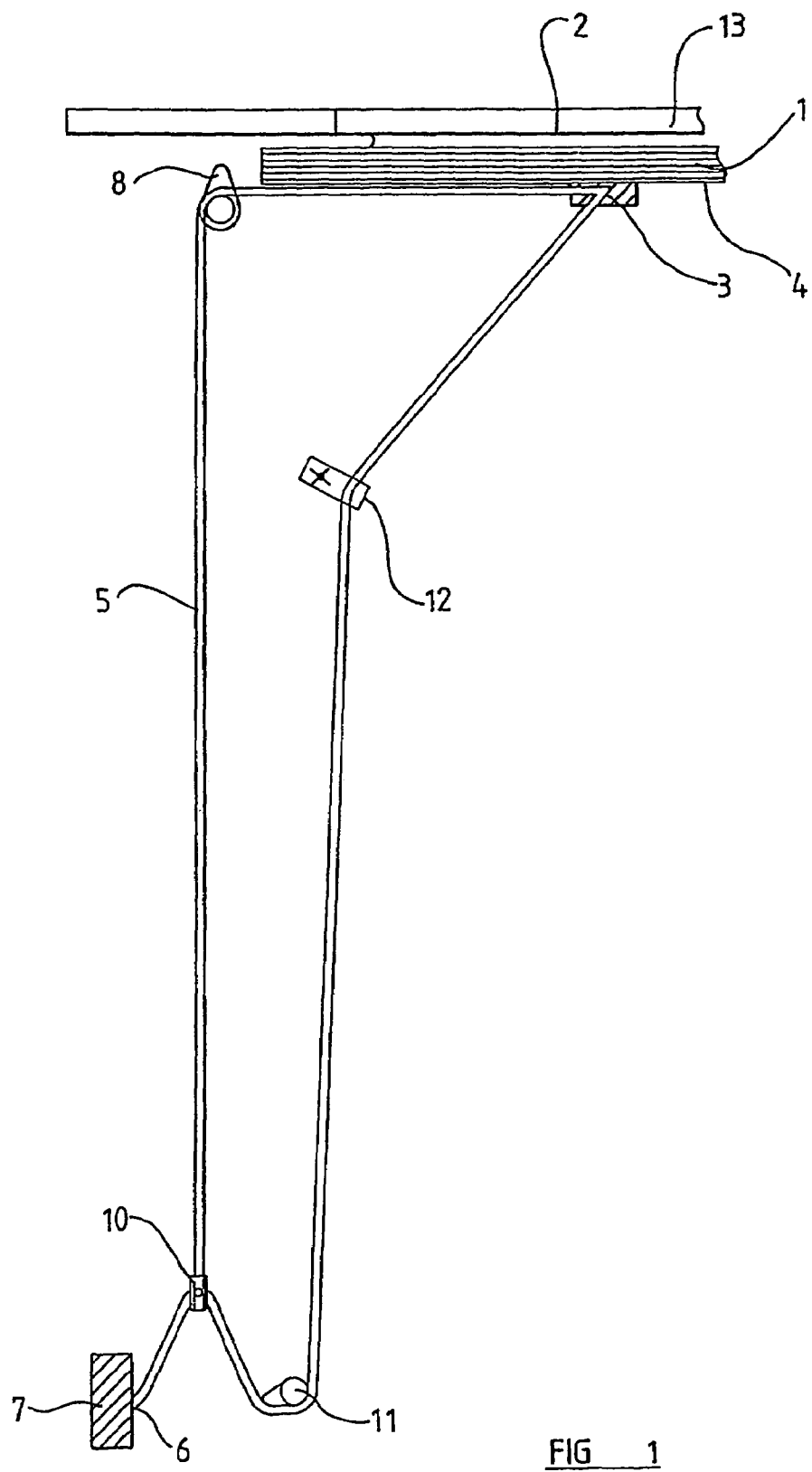
FIG. 1 is a diagrammatic side view of a safety device according to one aspect of the present invention with the inflatable curtain in an undeployed state.
Figure 2:
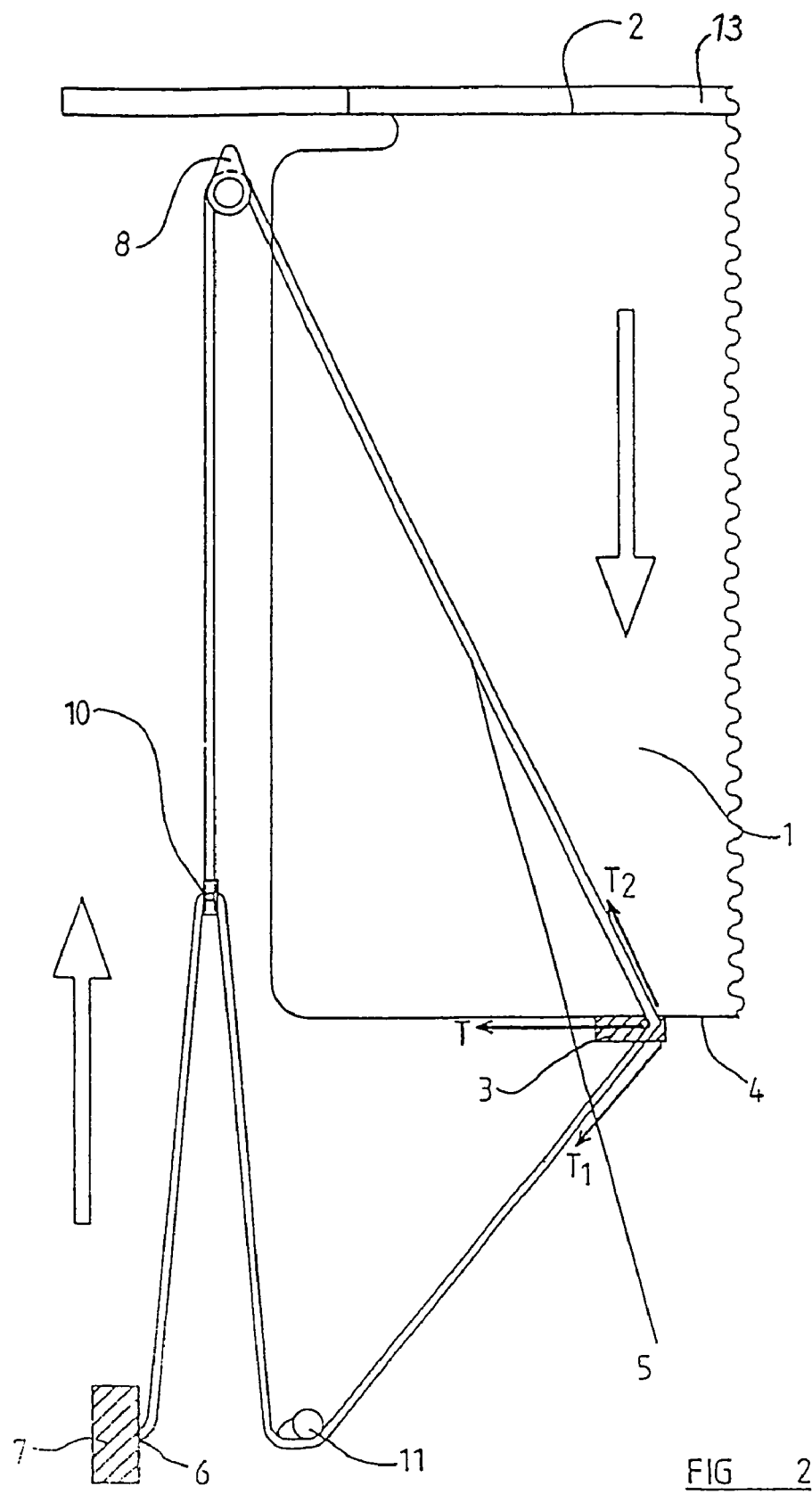
FIG. 2 is a view corresponding to FIG. 1 showing the inflatable curtain in a deployed state.

Referring now to FIGS. 1 and 2, an airbag is in the form of an inflatable curtain 1, of generally rectangular form. An upper edge 2 of the inflatable curtain is attached to part of the door frame 13 of a vehicle, extending above the doors. A lower edge 4 of the inflatable curtain runs substantially parallel to the lower edge of the door frame 13.

Fixedly attached to the inflatable curtain 1, at a single fixing point 3, which is adjacent the lower edge 4 of the inflatable curtain 1 is an intermediate part of an elongate flexible element, preferably in the form of a substantially inextensible cord 5, which may be formed from a strong material, with a high tensile strength, such as nylon. From the fixing point 3, a first portion of the cord 5 extends toward a first guide element, preferably in the form of an upper pulley 8, which is mounted adjacent the upper edge 2 of the inflatable curtain 1 and, after passing over the pulley 8, hangs down. The first portion terminates with a slide member in the form of a ring 10. A second portion of the cord 5 depends from the lower edge 4 of the inflatable curtain 1 towards a second guide element, which is preferably in the form of a lower pulley 11, and, after passing around the pulley 11 extends through the ring constituting the slide member at the end of the first cord portion. The second cord portion terminates at an end 6 which is fixedly attached to an anchoring point (shown schematically at 7) mounted on the motor vehicle:

The ring 10 is dimensioned to receive the cord 5 there through and is in slideable, low friction engagement with the portion of the cord 5 between fixing point 3 and lower pulley 11. The position of the fixing point 3, pulley 11, anchoring point 7, ring 10 and pulley 8 is such that initially the cord 5 lies substantially in a single plane, perpendicular to the roof of the motor vehicle (not shown).

A retaining element, preferably in the form of a clip 12, may be used to hold the cord 5 in a desired position prior to deployment of the airbag, for example to keep the cord out of view within the "B" or "C" post. The clip may take on various forms provided that it holds the cord 5 in place with sufficient force to prevent the cord breaking free upon jolting of the vehicle, but will release the cord on deployment of the inflatable curtain.

In the described embodiment of the invention, the fixing point 3 for the cord portions on the inflatable curtain is offset from a notional line joining the upper pulley and the lower pulley. The notional line passes adjacent one end of the inflatable curtain. The lower edge of the inflatable curtain at the other end thereof (not shown) is connected to a securing point.

Referring now to FIG. 2, upon deployment of the inflatable curtain 1, the lower edge 4 of the inflatable curtain 1 moves downwardly, as indicated by the arrow, with the force of the inflating curtain being sufficient to detach the clip 12, and hence cord 5, from the door frame of the motor vehicle. As the lower edge of the inflatable curtain 1 moves in a downward direction, the fixing point 3 is likewise moved in a downward direction causing the first portion of the cord 5 between fixing point 3 and ring 10 to be pulled over pulley 8 and consequently displacing the ring 10 upwardly as indicated by the arrow in FIG. 2. Upon this upward displacement of the ring 10, the length of the second portion of cord 5 between the cord 5 and the ring 10 is increased. The resultant effect is that the second portion of cord 5 is pulled past the second lower pulley 11 at almost twice the rate that the ring 10 rises.

Referring again to FIG. 2, it can be seen that the total length of the portions of cord 5 is such that, when the inflatable curtain is fully extended in a downward direction, any slack between ring 10, pulley 11 and fixing point 3 is totally eliminated creating a tension T1 along the section of cord 5 between fixing point 3 and pulley 11. The tension T1 extends downwardly with an inclination towards the lower pulley 11. In addition, the portion of cord 5 between ring 10 and fixing point 3 which passes over pulley 8 is held taut producing a tension T2 in a direction along cord 5 upwardly from the fixing point with an inclination towards the upper pulley 8. It will be appreciated, upon resolving forces T1 and T2, that there will be a resultant tension T, acting along the lower edge 4 of the inflatable curtain 1, applied to the fixing point 3 by the portion of cord. The creation of tension T along the lower edge of inflatable curtain 1, will, because the opposite end thereof is secured to a securing point, establish a line of tension which will help to maintain the inflatable curtain 1 in position and prevent the head of the passenger of the motor vehicle from passing through the window of the motor vehicle.

The tensioning system described above provides an almost immediate response to the inflation of the inflatable curtain 1, which inflation typically occurs over a time period of around 10-15 ms, the inflatable curtain 1 being placed under the required tension as soon as it reaches its fully extended position. The ability to tension the inflatable curtain very rapidly upon full inflation is important for providing maximum protection to the relevant passenger in the motor vehicle.

It will be appreciated that the precise form of the tensioning arrangement may be varied while still providing the sufficient tension along the lower edge of the inflatable curtain 1. The fixing point 3 can be positioned at a number of points along the lower edge 4 of inflatable curtain 1 and may even be positioned at some point on the inflatable curtain 1 above the lower edge. However, the positioning of the fixing point 3 at a level above the lower edge of inflatable curtain 1 would result in an un-tensioned portion of the airbag 1 between the lower edge and fixing point 3 which may be undesirable.

It is to be understood that the precise form of the fixing point 3 may be varied, provided it ensures secure connection of the cord 5 to the inflatable curtain as required. For example, the fixing point 3 may be in the form of a fabric loop which is sewn into the inflatable curtain and which is dimensioned to receive the cord in a friction-fit fashion. The cord may also be provided with stops on either side of the fabric loop, which are dimensioned so that they cannot pass through the loop, to prevent movement of the cord through the loop relative to the inflatable curtain. In another contemplated embodiment, fixing point 3 may be in the form of an elastic connection which provides an elastic connection between the cord 5 and inflatable curtain 1. In the case where two separate cords are used, one cord may be elastically connected to the inflatable curtain or both cords may be elastically connected to the inflatable curtain.

It will also be appreciated that pulley 11 may be positioned at a number of points, provided that it is below the level of pulley 8 and below the level of fixing point 3 when the airbag is fully extended. Indeed, the inclusion of pulley 11 is not essential to the effective working of the present invention.

Figure 3:
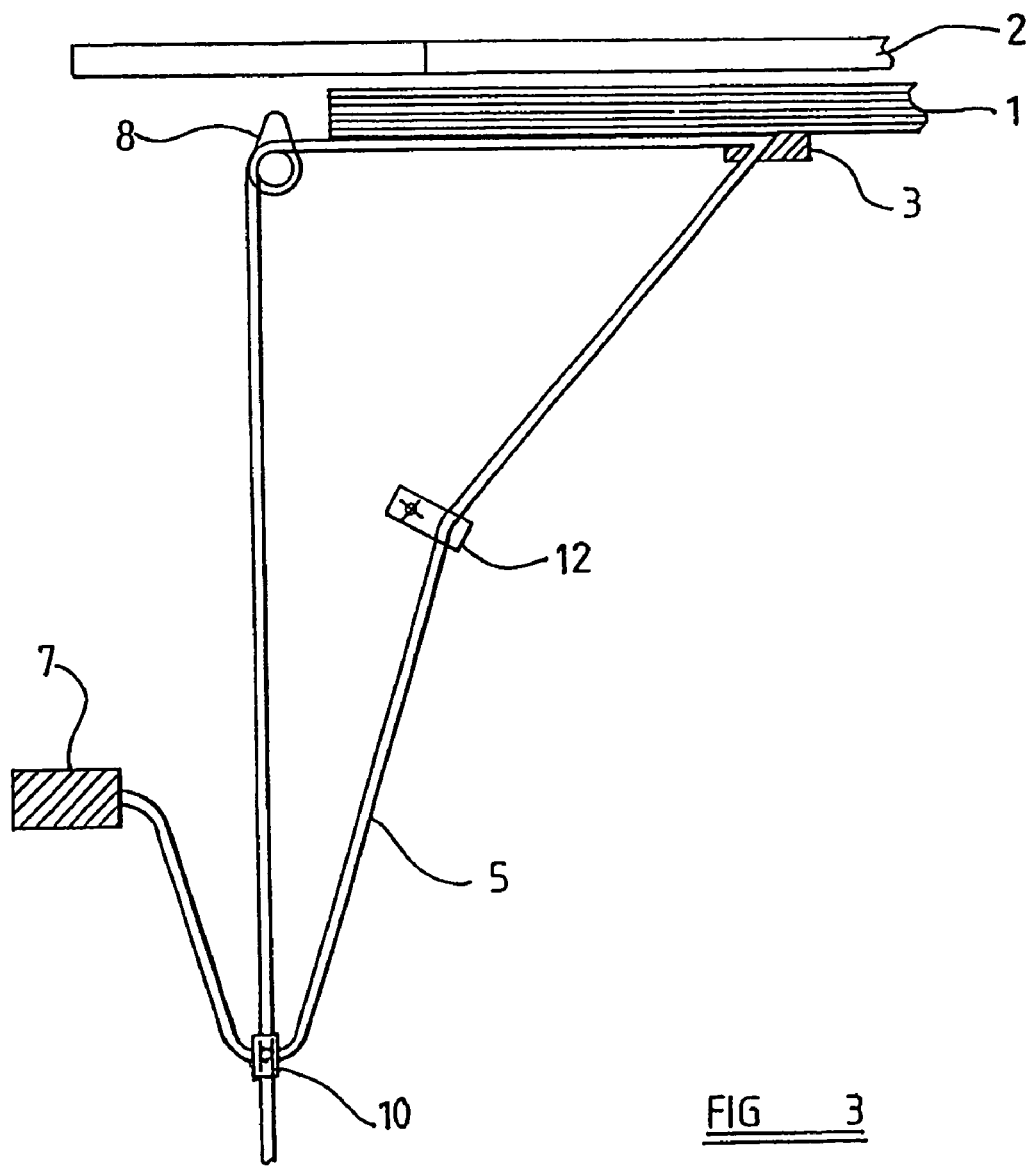
FIG. 3 is a view corresponding to FIG. 1 showing a safety device in accordance with a further aspect of the present invention, with the inflatable curtain in an undeployed state.

Thus, in another preferred embodiment, shown in FIG. 3, there is provided a tensioning arrangement similar to that shown in FIG. 1. The arrangement differs from that shown in FIG. 1 in that there is only one guide element, namely pulley 8.

Figure 4:
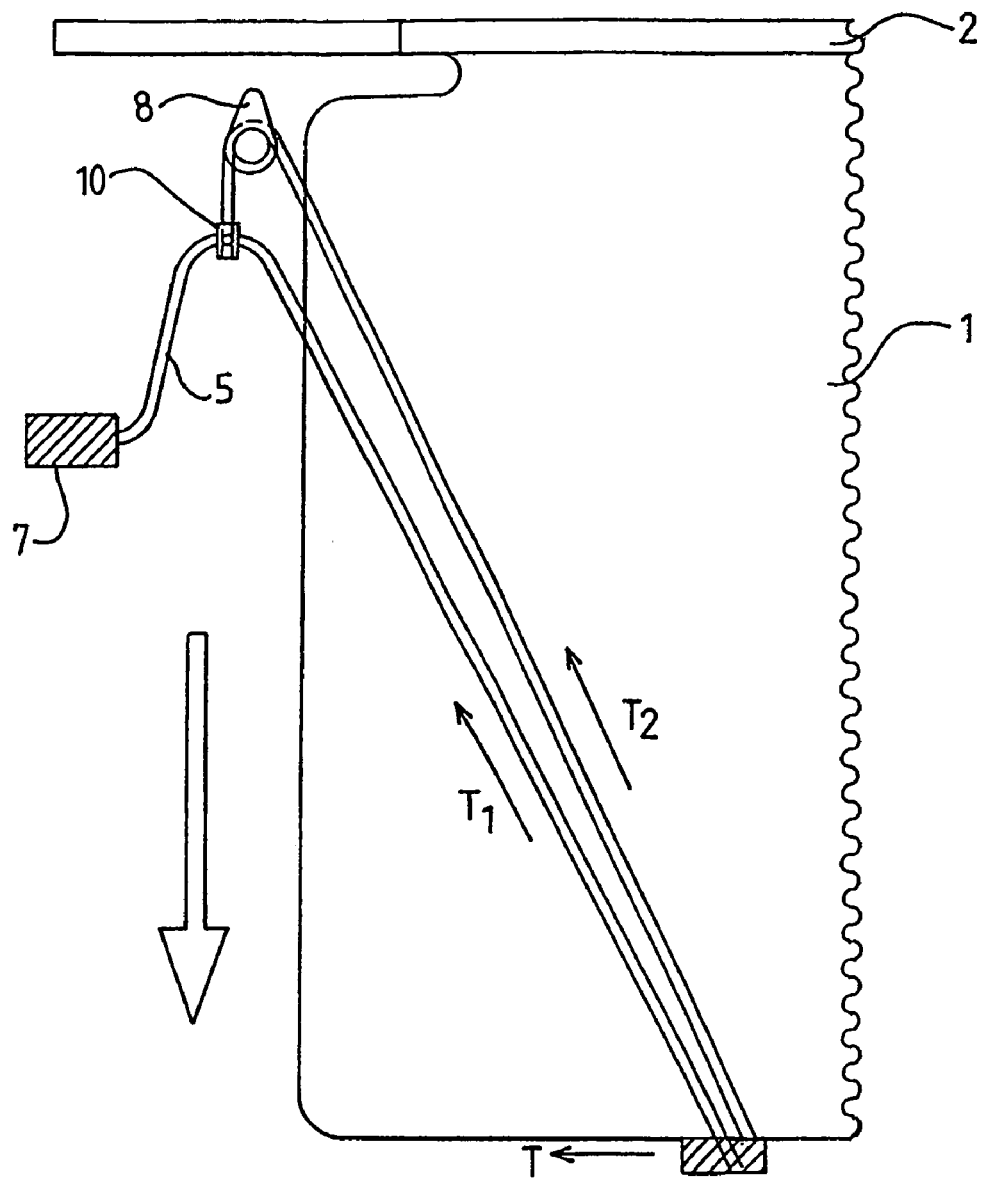
FIG. 4 is a view corresponding to FIG. 3 with the inflatable curtain in a deployed state.

Upon inflation of inflatable curtain 1 of FIG. 3 (FIG. 4), fixing point 3 moves downwardly with the lower edge of the inflatable curtain, which consequently causes ring 10 to be displaced upwardly, as previously described in connection with the embodiment shown in FIG. 1. However, in contrast to the embodiment shown in FIG. 1, displacement of the ring 10 from an initial position below the anchoring point 7 to a point significantly higher than the anchoring point 7 creates a direct line of tension between fixing point 3 and ring 10, indicated as T1 in FIG. 4. Upon resolving the line of tension T1, along with tension T2 created as aforedescribed with reference to FIG. 1, it will be appreciated that there is a resultant component of tension which extends between T1 and T2. This co-operates with a downward force created by the downward movement of the lower edge of the inflatable curtain to provide a generally horizontal tension T in the lower edge of the inflatable curtain.

The precise position of anchoring point 7 may be varied without compromising the effective working of the invention, provided always that the anchoring point is positioned sufficiently below the level of the pulley 8. For example, with reference to FIGS. 3 and 4, the anchoring point 7 may be positioned so that, upon inflation of the inflatable curtain, it is located higher than the fixing point 3. It will be appreciated that the position of anchoring point 7 is a compromise between, on the one hand, minimising the slack in the cord 5 when the inflatable curtain is an undeployed state (so as to facilitate easy discrete storage of the cord in the frame of the vehicle) and, on the other hand, minimising the amount of slack to be taken up, thereby decreasing the time taken to tension the inflatable curtain.

The embodiment shown in FIGS. 1 and 2 incorporates a single cord 5, but it is envisaged that the invention would work equally effectively with two separate portions of cord, the first portion of cord extending from fixing point 3, around pulley 8, and terminating in ring 10 and the second portion of cord extending from fixing bracket 7, passing through ring 10 and being fixed at its other end to fixing point 3. Indeed, where two portions of cord are used, they need not both be attached to fixing point 3, but rather may be attached to the lower edge of the inflatable curtain at separate points adjacent the lower edge. Furthermore, although the preferred embodiments described herein, by way of example and with reference to the accompanying drawings, utilizing inextensible cord, it is to be understood that strong elastic cord, whether in the form of a single elastic cord or two separate elastic cords, may equally be used. Indeed, in the case where two separate cords are employed, one of the cords may be elastic and the other inextensible.

Although the embodiment shown in FIGS. 1 and 2 shows the use of a pulley 8, and a second pulley 11, which act as guide elements, it is envisaged that a wide variety of guide elements may be employed in place of such a pulley, it only being necessary that the cord pass around and engage with the guide element such that the cord may slide relatively freely around the external surface of the guide element. In its simplest form, the guide elements may be in the form of rigid projecting elements around which the cord 5 may pass.

While the above description constitutes the preferred embodiment of the present invention, it will be appreciated that the invention is susceptible to modification, variation and change without departing from the proper scope and fair meaning of the accompanying claims.

The invention claimed is:

1. A safety device for a motor vehicle comprising an inflatable curtain having an upper edge and a lower edge, the upper edge being adapted to be mounted to the motor vehicle within the interior of the motor vehicle, a first portion of elongate flexible element being attached to and extending from the inflatable curtain at a first point of attachment, a second portion of elongate flexible element being attached to and extending from the inflatable curtain at a second point of attachment, wherein one of the first or the second points of attachment is in the form of an elastic connection, the first portion of elongate flexible element incorporating a slide member adapted to slidably retain a length of the second portion of elongate flexible element whereby, upon deployment of the inflatable curtain, the first and second portions of elongate flexible element are placed in tension, which exerts tension on the inflatable curtain.

2. A safety device for a motor vehicle comprising an inflatable curtain having an upper edge and a lower edge, the upper edge being adapted to be mounted to the motor vehicle within the interior of the motor vehicle, a first portion of elongate flexible element being attached at one end to the inflatable curtain, a second portion of elongate flexible element being attached at one end to the inflatable curtain and having a second end attached to the motor vehicle, wherein the first and second portions of elongate flexible element are attached to the inflatable curtain at a common point near the lower edge, a second end of the first portion of elongate flexible element incorporating a slide member adapted to slidably retain a length of the second portion of elongate flexible element whereby, upon deployment of the inflatable curtain, the lower edge moves downwardly from the upper edge causing the second portion of elongate flexible element to slide through the slide member and the first and second portions of elongate flexible element are placed in tension, which exerts tension on the inflatable curtain.

3. The safety device according to claim 2 wherein the first and second portions of elongate flexible element are separate segments of a single elongate flexible element.

4. The safety device according to claim 2 wherein the slide member is in the form of a rigid ring.

5. The safety device according to claim 2 wherein at least one of the first or the second portions of elongate flexible element is elastic.

6. The safety device according to claim 2 wherein both of the first and the second portions of elongate flexible element are elastic.

7. The safety device according to claim 2 wherein both of the first and the second portions of elongate flexible element are substantially inextensible.

8. The safety device according to claim 2 wherein the common point of attachment between the first and second portions of elongate flexible element and the inflatable curtain is in the form of an elastic connection.

9. The safety device according to claim 1 wherein the slide member is in the form of a rigid ring.

10. The safety device according to claim 1 wherein at least one of the first or the second portions of elongate flexible element is elastic.

11. A safety device for a motor vehicle comprising an inflatable curtain having an upper edge and a lower edge, the upper edge being adapted to be mounted to the motor vehicle within the interior of the motor vehicle, a first portion of elongate flexible element being attached at one end to the inflatable curtain at a first point of attachment near the lower edge, a second portion of elongate flexible element being attached at one end to the inflatable curtain at a second point of attachment near the lower edge and having a second end attached to the motor vehicle, wherein one of the first or the second points of attachment is in the form of an elastic connection, a second end of the first portion of elongate flexible element incorporating a slide member adapted to slidably retain a length of the second portion of elongate flexible element whereby, upon deployment of the inflatable curtain, the lower edge moves downwardly from the upper edge causing the second portion to slide through the slide member and the first and second portions of flexible element are placed in tension, which exerts tension on the inflatable curtain.

12. The safety device according to claim 11 wherein the slide member is in the form of a rigid ring.

13. The safety device according to claim 11 wherein at least one of the first or the second portions of elongate flexible element is elastic.

* * * * *